United States Patent [19]
Kuhn et al.

[11] Patent Number: 5,769,747
[45] Date of Patent: Jun. 23, 1998

[54] BELT TENSIONING MECHANISM WITH STOP FEATURE

[75] Inventors: John Boyd Kuhn, Rubicon; Timothy Milton Post, Portage, both of Wis.

[73] Assignee: Deere & Company, Moline, Ill.

[21] Appl. No.: 708,568

[22] Filed: Sep. 5, 1996

[51] Int. Cl.[6] ....................................................... F16H 7/12
[52] U.S. Cl. ........................... 474/135; 474/138; 56/17.1
[58] Field of Search .................................... 474/135, 138, 474/148, 150; 56/16.9, 17.1

[56] References Cited

U.S. PATENT DOCUMENTS

| | | | |
|---|---|---|---|
| 3,766,722 | 10/1973 | Kamlukin et al. | 56/11.6 |
| 3,785,085 | 1/1974 | Parker et al. | 56/16.9 X |
| 4,068,452 | 1/1978 | Schaefer et al. | 56/11.6 |
| 4,346,547 | 8/1982 | Allison | 56/13.6 |
| 4,813,215 | 3/1989 | Chase et al. | 56/11.6 |
| 5,012,632 | 5/1991 | Kuhn et al. | 56/11.6 |
| 5,197,267 | 3/1993 | Aldred et al. | 56/17.1 X |

OTHER PUBLICATIONS

Deere & Co., Operator's Manual OMM123173 B5 entitled "60 and 72–Inch Side Discharge Mower for Front Mowers (Serial No. 140001—) Operator's Manual", 3 pages—front cover, table of contents page, pp. 36 and 37(combined on one page), dated 1994, published in the U.S.A.

Deere & Co., Parts Catalog PC2114 entitled "50", 60" and 72" Mowers (655, 755, 855 and 955 Compact Utility Tractors)", pp. 30–34 and 30–35, dated 25 Apr. 1995, published in the U.S.A.

*Primary Examiner*—Roger J. Schoeppel

[57] ABSTRACT

A tensioner mechanism adapted for placing tension in a drive belt of a mower deck, the tensioner including an elongate member operatively coupled with an idler arm, and slidably mounted with a support member operatively carried by the mower deck. A compression spring carried on the elongate member between the idler arm and the support member operatively presses the idler arm away from the support member and is completely compressed during normal mowing operations for generally blocking the idler arm from swinging toward the support member during operation. A threaded member within which said elongate member is slidably received is adjustably fixed with the support member by a pair of nuts that can be adjusted on the threaded member to alter the position of the threaded member with respect to the mower deck for adjusting the tension that the idler pulley places in the belt during normal mowing operations. The position of an indicator adjacent to the threaded member serves to visually indicate to the operator that the tensioning mechanism has been properly adjusted to place the appropriate amount of tension in the belt.

9 Claims, 3 Drawing Sheets

BELT TENSIONING MECHANISM WITH STOP FEATURE

BACKGROUND OF THE INVENTION

The present invention relates to mechanisms for tensioning mower deck drive belts.

It is known to mount a plurality of mower blades within a mower deck housing for cutting vegetation as the mower blades rotate. Each mower blade is fixed to a respective spindle which is received by bearings mounted within respective spindle housings. The spindle housings are typically fixed to the mower deck by bolts, and are laterally spaced from each other across the width of the mower deck such that the mower blades cut a wide swath of grass with each pass of the mower deck.

Many conventional mowing vehicles utilize a belt and pulley system for transmitting driving power from the vehicle power source to the blade spindles. These systems include a plurality of blade pulleys fixed with respective blade spindles. A drive belt engages these blade pulleys. A drive pulley which drivingly engages the belt typically receives rotational power from the vehicle's power source via a gear box, hydraulic motor, or belt and pulley system. An idler pulley engages the belt for tensioning the belt and is typically carried by a swingable idler arm that pivots for pressing the idler pulley against the belt. The idler pulley typically engages a relatively slack or loose portion of the belt, and is biased against the belt by a tension spring for placing drive tension in the belt. The belt tension provided by the idler pulley establishes the proper friction between the belt and blade pulleys to thereby prevent slippage. The belt tension applied by the idler pulley also generally prevents slack from accumulating in the belt, and thereby generally prevents the belt from becoming disengaged from the various pulleys during operation.

Conventional tensioning mechanisms provide a tension spring mounted to the idler arm for pulling the idler arm in a direction that will press the idler pulley against the belt, thereby tensioning the belt. These springs are in tension and typically include hooked end portions at their opposite ends which engage the idler arm and the mower deck, respectively. During operation, the tension spring flexes continuously to maintain the proper tension in the belt. Vibrations in the belt resulting from normal operation of the vehicle cause the tension spring to repeatedly extend and retract a large number of times. Metal fatigue resulting from the tensioner spring's high number of extension and retraction cycles can cause the hook portions of the tension springs to fail. Maintenance operations to replace the tension springs are an undesirable interruption to mowing operations, and the replacement cost of the tension springs adds expense to mowing operations.

After long periods of operation, the belt will typically become stretched and achieve a greater length. Conventional tensioning springs will contract to accommodate belt stretching. The contracted springs are therefore now shorter and will therefore exert a different force than the proper or recommended tension force. Conventional mower deck belt tensioners do not provide mechanisms for adjusting the tensioning springs to apply a proper force after belt stretching has occurred.

There are at least two situations wherein the blade pulleys will press the belt against the idler pulley with an abrupt and aggressive force that can cause the belt to flap or whip undesirably. When whipping of the belt becomes extremely severe, the belt can become disengaged from the pulleys.

The first situation when this can occur is when one of the blades strikes an object and decelerates rapidly. When a blade strikes an object, that blade and its blade pulley will decelerate or stop, creating friction between that blade pulley and belt, which tends to slow or stop the belt. The momentum of the other blades that did not encounter the object causes those other blades and their respective blade pulleys to tend to continue rotating within the mower deck for a brief period of time. As these other blades continue rotating, friction between the rotating blade pulleys and the belt begin to drive the belt. When these other pulleys momentarily drive the belt, the portion of the belt engaged by the idler pulley can be momentarily placed under a large amount of tension. This tension can often be great enough to pull on the idler pulley and idler arm to such a degree that the tension spring extends. When the tension is released from the belt, such as when the blade is clear of the obstruction, the tension in the spring will tend to pull or swing the idler arm and idler pulley back to its normal position. As the idler pulley swings back and forth after a blade encounters an obstruction, the belt can whip about to such a degree on some mowers that the belt becomes disengaged from one of the pulleys. This requires an operator to stop mowing operations to perform the various procedures for placing the belt back on the pulleys. These procedures pose an undesirable interruption to mowing operations. Furthermore, the belts can be damaged when they become disengaged from the pulleys in the manner described above.

A second situation wherein the potential exists for drive belt whip occurs when a brake is applied to the drive pulley. Many conventional mowing vehicles automatically apply a brake to the drive pulley when the operator gets out of the driver's seat, or when the mower deck is lifted to a transport position. The drive pulley, belt and mower blades are rapidly stopped by this brake system so that the blades are stopped a short period of time after the operator dismounts the mowing vehicle or the deck is lifted. As the brake is applied to the drive pulley, the momentum of the rotating blades causes the blades to continue to rotate for a short period of time. As the blades continue to rotate, the blade pulleys also continue to rotate and begin to drive the belt. As stated above in the previous paragraph, when the blade spindles drive the belt in this manner for this short period of time, the portion of the belt which is engaged by the idler pulley is momentarily placed under a large amount of tension. This causes the idler pulley and idler arm to swing in the direction that will extend the tension spring. The tension in the tension spring then pulls the idler arm and idler pulley back toward its normal position as blade rotation slows. As the idler pulley swings back and forth during this short period of time, some mowers allow slack and belt whip to disengage the belt from one of the pulleys which, as stated above, will cause damage to the belt and an undesirable interruption or delay in mowing operations.

Some conventional mower deck belt and pulley mechanisms are provided with a bumper mechanism that abuts the idler arm to limit the idler arm's movement in one direction. Therefore, when a blade strikes an obstruction or the brake is applied to the drive pulley, the bumper will abut the idler arm, limit movement of the idler arm and idler pulley, and reduce the amount of belt whipping that will occur. These bumpers are intended to help prevent the belt from disengaging from the pulleys after an obstruction has been struck or the drive pulley brake has been applied. These bumpers tend to add to the assembly and manufacturing costs of the deck. Also, undesirable loud noises can be generated when the idler arm strikes the bumper.

It would therefore be desirable to provide a belt tensioner for a mower deck drive system that reduces or eliminates belt whip that may occur, for example, when a blade encounters an obstruction of when a brake is applied to the drive pulley. It would also be desirable for such a mechanism to operate relatively quietly when the blade encounters an obstruction or when a brake is applied to the drive pulley. It would also be desirable for such a mechanism to reduce or eliminate problems associated with fatigue failure in the end hooks of conventional tension springs. It would also be desirable for such a mechanism to be easily adjustable for placing the proper amount of tension in the drive belt.

SUMMARY OF THE INVENTION

According to the present invention, a tensioner mechanism is provided having a compression spring positioned on a rod member. The mechanism and compression spring bias an idler arm to shift such that the idler pulley is pressed against a mower deck drive belt. The idler pulley thereby applies an appropriate amount of tension to the belt. The compression spring is positioned between a pair of washers. The first washer abuts against a portion of the rod member, and the second washer abuts against a threaded member having an opening within which the rod member is slidably positioned. The threaded member is positioned within an opening in a support member rigidly fixed to the mower deck. The support member is confined between a pair of nut members engaged with the threads of the threaded member. The compression spring operatively presses the idler arm away from the support member for applying a force to the idler arm which swings the idler pulley into engagement with the drive belt.

The compression spring is completely compressed during normal mowing operation. Therefore, the completely compressed compression spring acts as a stop feature that will block the idler arm and idler pulley from further pivoting toward the support member. Belt whip is thereby generally eliminated, for example, when a blade encounters an obstruction or when the brake is applied to the drive pulley. The stop feature operates relatively quietly, since the compression spring is fully compressed during normal operation.

The tensioner mechanism is adjustable by an operator for applying the appropriate amount of tension in the drive belt. The nuts can be adjusted to shift the position of the threaded member within the opening in the support member, thereby shifting the compression spring to a new position. Shifting of the spring in this manner will apply a different force to the idler arm and pulley, thereby altering the tension in the belt. The nut members can be manipulated until an indicator opening formed in the rod member becomes aligned with the edge of the threaded member. Alignment of the indicator opening with the edge of the threaded member visually indicates to the operator that the proper amount of tension is being placed in the belt.

Figure 1:
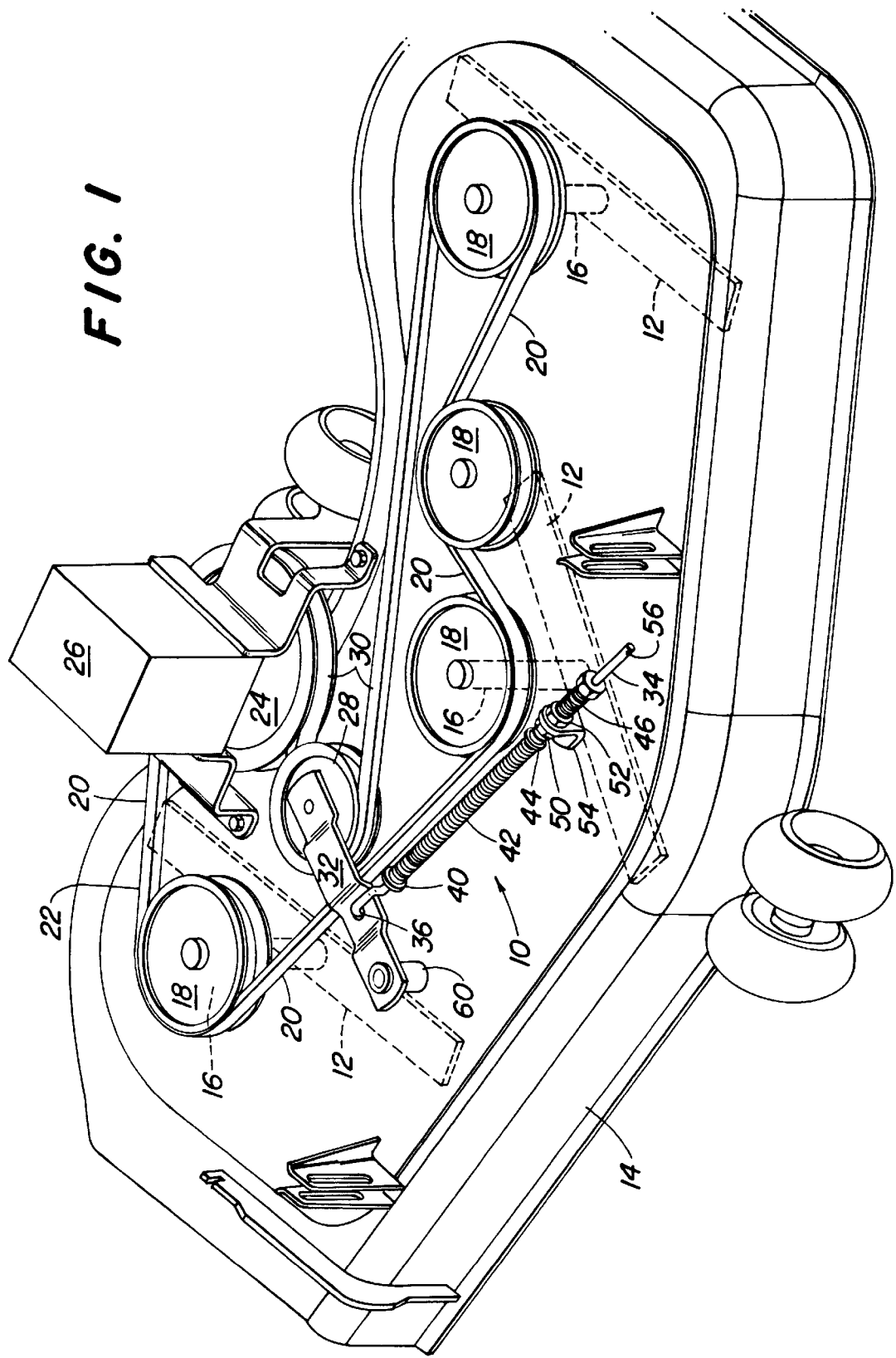
FIG. 1 is a perspective view of a mower deck with a belt and pulley drive system and tensioner mechanism according to the preferred embodiment of the present invention.

FIG. is a side view of the tensioner mechanism shown in FIG. 1.

DESCRIPTION OF THE PREFERRED EMBODIMENT

Figure 2:
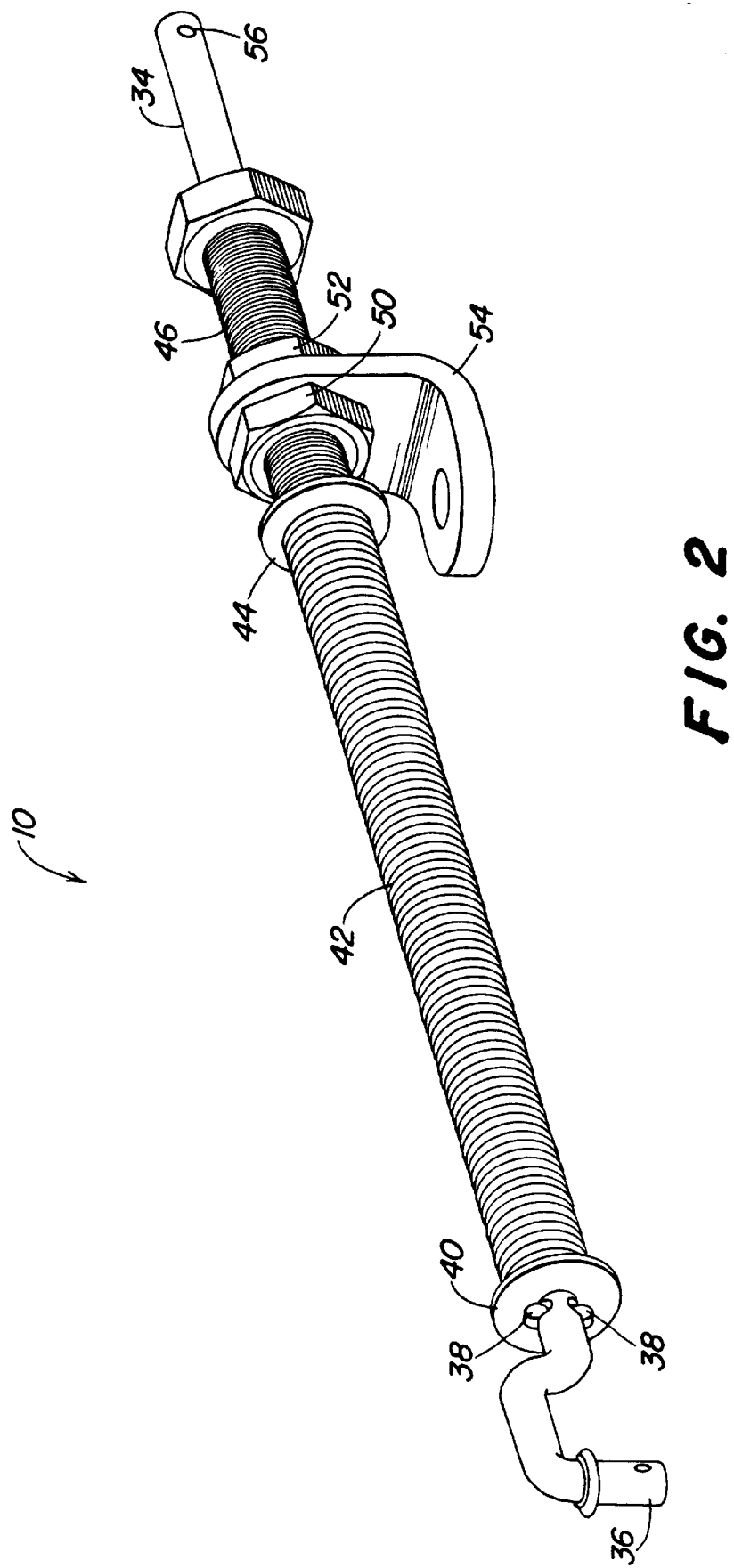
FIG. 2 is a perspective view of the tensioner mechanism shown in FIG. 1.
Figure 3:
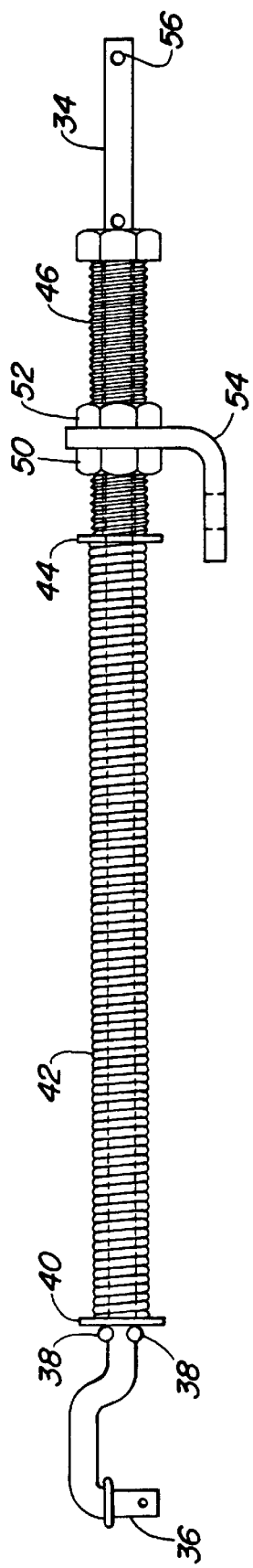

Referring now to FIGS. 1–3, there is shown the preferred embodiment of the tensioner mechanism 10 according to the present invention. Mower blades 12 rotate beneath the mower deck housing 14 and are fixed to spindles 16 which are rotatively received within spindle housings (not shown). The spindle housings are bolted or otherwise fixed to the mower deck 14 . Blade pulleys 18 are mounted above the deck 14 to the top portions of respective spindles 16, and are drivingly engaged by a first portion 20 of a drive belt 22. A rotating drive pulley 24 engages the belt 22 and drives the belt 22 in a clockwise direction as viewed in FIG. 1. The drive pulley 24 receives rotational power from the vehicle power source (not shown) via a gear box 26. Rotational power is thereby transmitted from the vehicle power source to the gear box 28, to the drive pulley 24, to the drive belt 22, to the respective blade pulleys 18, to the spindles 16, and finally to the blades 12. An idler pulley 28 engages a relatively slack second portion 30 of the drive belt 22, and is biased into engagement with the belt 22 for placing the proper amount of tension in the belt 22. The idler pulley 28 is carried by an idler arm 32 that is pivotally mounted to the mower deck housing 14.

The tensioner mechanism 10 extends between the mower deck 14 and the idler arm 32 and applies a force to the idler arm 32 for biasing the idler pulley 28 against the belt 22 with the proper amount of force. The tensioner mechanism 10 includes an elongate member or rod member 34 having a downturned end portion 36 that is received within an opening in the idler arm 32. A pair of dog ears or stakes 38 are formed in the rod 34 for abutment with a first washer 40. The first washer 40 abuts a compression spring 42 within which the rod 34 is positioned. A second washer 44 abuts the other end of the compression spring 42. A threaded member 46 abuts against the second washer 44, and includes a central opening 48 within which the rod 34 is slidably positioned. A pair of nut members 50 and 52 are engaged on the threaded portion of the threaded member 46. Between the nut members 50 and 52 a support member 54 is captured which is rigidly fixed with the mower deck housing 14. A pin 56 extends through an end portion of the rod 34 and is abutable against the threaded member 46 when the compression spring 42 extends, thereby preventing the tensioner mechanism 10 from coming apart when the compression spring 42 extends. An indicator hole 58 is also formed in the rod member 34 and is positioned adjacent the end portion of the threaded member 46 when the proper amount of biasing force is being applied to the idler arm 32 by the tensioner mechanism 10.

Next, the operation of the present invention will be discussed in greater detail. During normal mowing operations, power is transmitted from the vehicle power source to the blades 12 by way of a system of belts and pulleys. The power source drives a gear box 26 which is coupled to the drive pulley 24 by a drive shaft (not shown). The rotating drive pulley 24 drives the belt 22 in a clockwise direction as viewed in FIG. 1. The blade pulleys 18 engage the belt 22 and are also driven in a clockwise direction. The spindles 16 rotate with the blade pulleys 18 to cause the mower blades 12 to rotate within the deck housing 14 for cutting vegetation.

The idler pulley 28 is biased to press against the belt 22 and thereby places tension in the belt 22 during normal mowing operations. The tension placed in the belt 22 by the idler pulley 28 helps maintain the belt 22 in good contact with the blade pulleys 18 so that slippage is minimized during normal operation, and also helps prevent the belt 22 from becoming disengaged from the blade pulleys 18.

The idler pulley 28 engages a portion 30 of the belt 22 that would otherwise be relatively slack. The drive pulley 24 acts to pull the first portion 20 of the belt 22 in a clockwise direction. Since the belt 22 is flexible and non-rigid, the drive pulley 24 can not push or compress the second portion 30 of the belt 22 engaged by the idler pulley 28. Therefore, the first portion 20 of the belt 22 is made taught by the drive pulley 24, and the second portion 30 of the belt 22 is made relatively slack. Since the idler pulley 28 engages the relatively slack second portion 30 of the belt 22, only a relatively small amount of force must be applied in order to take up the slack and place the proper tension in the belt 22. If the idler pulley 28 was placed in engagement with the taught first portion 20 of the belt 22, a larger force would have to be applied in order to remove the slack from the second portion 30 of the belt 22 and place the proper tension in the belt 22.

The tensioner mechanism 10 according to the present invention applies a force to the idler arm 32 and thereby serves to bias the idler pulley 28 toward engagement with the belt 22 for taking up slack in the belt 22 and placing the proper amount of tension in the drive belt 22. The compression spring 42 extends between and presses against a pair of washers 40 and 44. The second washer 44 is pressed against the threaded member 46, which presses the first nut 50 against the support member 54. The support member 54 is rigidly fixed with the mower deck housing 14 and therefore provides a solid structure against which the compression spring 42 can press. The first washer 40 is pressed by the compression spring 42 against a pair of dog ears 38 formed in the rod member 34. The compression spring 42 therefore biases the rod 34 to the left as viewed in FIG. 1. The rod 34 engages the idler arm 32 and biases the idler arm 32 to pivot in a counterclockwise direction about its support connection 60 as viewed in FIG. 1. The idler pulley 32 is thereby biased to swing into engagement with the belt 22.

As stated above, during normal mowing operations the compression spring 42 is completely compressed between the first and second washers 40 and 44. Therefore, when extra slack is present in the belt 22, the compression spring 42 will extend to force the idler pulley 28 toward engagement with the belt 22 to place proper tension in the belt 22 and take up any slack. Since the compression spring 42 is normally completely compressed, the tensioner mechanism 10 acts as a stop which generally blocks the idler pulley 28 from shifting in a direction away from the belt 22. Therefore, when extra tension is placed in the second portion 30 of the belt 22, such as when a blade 12 hits an obstruction or when a brake is applied to the drive pulley 24, the tensioner mechanism 10 according to the present invention generally prevents the idler pulley 28 from shifting in response to this extra tension, as will be described in greater detail below.

During mowing operation, one of the blades 12 may strike an obstruction, which can cause that blade 12 to be momentarily slowed or stopped. Slowing or stopping of the blade 12, and the spindle 16 and blade pulley 18 fixed thereto, can act to momentarily slow or stop the belt 22. The other blades 12 continue to rotate, and their momentum can act to drive the slowing belt 22 via the blade pulleys 18. When the belt 22 is momentarily driven in this fashion, the blade pulleys 18 pull on the second portion 30 of the belt 22 and thereby place the second portion 30 of the belt 22 in tension. This tension will want to pull the idler pulley 28 to the right from its position shown in FIG. 1. But the compression spring 42 is already completely compressed, and the tensioner mechanism 10 therefore acts as a generally rigid structure that blocks the idler pulley 28 from shifting in that direction. The tensioner mechanism 10 according to the present invention thereby hinders idler pulley movement away from the belt 22, generally prevents the belt 22 from whipping when a blade 12 hits an obstruction, and generally hinders the belt 22 from becoming disengaged from the pulleys 18, 24 and 28. Since the compression spring 42 is already fully compressed when tension is applied to the second portion 30 of the belt 22, no loud noise or banging sound will occur. After the blade 12 is clear of the obstruction, the tensioner mechanism 10 will act to return the belt 22 to its normally tensioned mode of operation.

It is known to automatically apply a brake to the drive pulley 24 when the operator gets up out of the vehicle seat so that the mower blades 12 are quickly stopped before the operator can come in contact with the blades 12. When the brake is applied to the drive pulley 24, the momentum of the rotating blades 12 and blade pulleys 18 can act to continue to drive the belt 22 for a short period of time. In this situation the blade pulleys 18 pull on the second portion 30 of the belt 22 and place the second portion of the belt 22 under high tension. This tension will want to pull the idler pulley 28 to the right from its position shown in FIG. 1. However, the compression spring 42 is already completely compressed and does not allow the idler pulley 28 to shift to the right. The belt 22 is thereby generally prevented from whipping or becoming disengaged from any of the various pulleys 18, 24 and 28 when the drive pulley brake is applied. The blades 12 will quickly come to a stop as the friction between the belt 22 and the stationary drive pulley 24 overcomes the momentum of the blades 12.

When properly adjusted, the tensioner mechanism 10 establishes tension in the belt great enough for the belt 22 to engage the pulleys 18, 24 and 28 with enough friction to prevent slippage during normal mowing operations. When a blade 12 strikes an obstruction, or when a brake is applied to the belt 22, the compression spring 42 is completely compressed and the belt 22 will slip with respect to the pulleys 18, 24 and 28 so that the belt and pulley system is not damaged. The tensioner mechanism 10 according to the present invention therefore tensions the belt 22 such that friction between the belt 22 and pulleys 18, 24 and 28 is large enough to generally prevent slippage during normal operation, but small enough to allow slippage such as when a blade 12 strikes an obstruction.

The tensioner mechanism 10 according to the present invention is adjustable by the operator so that it applies the proper amount of tension to the drive belt 22. Adjustment is recommended, for example, when the belt 22 has become stretched after long periods of operation. Slack is created after the belt 22 has become stretched and the compression spring 42 extends to take up this belt slack. When extended, the spring 42 exerts a smaller force to the belt 22 than is recommended, and therefore adjustment of the tensioner mechanism 10 is required. To adjust the tensioner mechanism 10, the nuts 50 and 52 are adjusted on the threads of the threaded member 46 to thereby shift the position of the threaded member 46 within the opening in the support member 54 fixed to the deck 14. After the belt becomes stretched over time, the nuts 50 and 52 should be adjusted so that the threaded member 46 shifts to the left from the position shown in FIG.

1. This causes the threaded member 46 and second washer 44 to press against the compression spring 42 in the leftward direction. As the right end portion of the compression spring 42 shifts to the left, the spring 42 is compressed and thereby applies a greater force to the belt 22 via the rod member 34, idler arm 32 and drive pulley 28.

An indicator opening 58 is formed in the rod member 34 for visually indicating to the operator when the proper tension is being applied to the belt 22. When the tension is being adjusted, the rod member 34 shifts within the central opening 48 in the threaded member 46. When proper tension is applied to the belt 22, the rod member 34 is positioned within the threaded member 46 in such a position that the indicator 58 is just visible past the end portion of the threaded member 46, as best seen in FIG. 3. The present invention allows the operator to adjust the nuts 50 and 52 on the threaded member 46 until the indicator 58 is visible adjacent the end portion of the threaded member 46, and the operator is thereby informed that the mechanism 10 is properly adjusted for placing the recommended tension in the belt 22.

The present invention is adapted for applying proper tension to the belt 22 when the compression spring 42 is completely compressed. As stated above, when properly adjusted the indicator opening 58 is just visible past the end portion of the threaded member 46. If the spring 42 is placing less than the recommended tension in the belt 22, then the indicator opening 58 will be hidden from view within the threaded member 46. In this under-tensioned mode, the spring 42 is extended from its completely compressed configuration. The extended spring 42 exerts a smaller force than when fully compressed and therefore does not tension the belt 22 to the recommended degree. When adjusting the nuts 50 and 52 to increase the spring force to the proper amount, the operator should stop adjusting the nuts 50 and 52 immediately after the indicator opening becomes visible adjacent the end portion of the threaded member 46. If the operator continues to turn the nuts 50 and 52 past this point, then the nuts 50 and 52 will shift the threaded member 46, completely compressed spring 42 and rod 34 to the left from the position shown in FIG. 1, which will further press the idler pulley 28 against the belt 22 with even greater force. Excessive force will thereby be applied to the belt 22. Therefore, the operator should stop turning the nuts 50 and 52 immediately when the indicator 58 appears adjacent the end of the threaded member 46.

The indicator 58 according to the present invention is adapted to indicate proper belt tension even after the belt 22 has stretched after long periods of use. The rod member 34 serves as structure against which the length of the spring 42 can be measured. When properly adjusted the indicator opening 58 formed in the rod member 34 is visible adjacent the threaded member 46. When the belt 22 stretches, the idler pulley 28 will shift to the left from its position shown in FIG. 1. The rod 34 will shift with the idler arm 32 as the idler pulley 28 shifts to the left to accommodate belt stretching. The rod member 34 will shift to the left from its position shown in FIG. 3, causing the spring 42 to extend. Since the rod member 34 shifts to the left with respect to the deck 14 and support member 54, the indicator opening 58 will also shift to the left and become concealed within the threaded member 46. When the rod member 34 and idler pulley 28 achieve their new positions after the belt stretches, the nuts 50 and 52 should be adjusted until the indicator opening 58 again becomes visible. Because the rod member 34 shifts with the idler arm 32 and idler pulley 28 as the belt stretches, the rod member 34 remains properly positioned to serve as a reference for measuring or indicating the proper length of the spring 42 even after the belt 22 stretches.

The compression spring 42 according to the present invention is completely compressed during normal operation. However, vibration of slack in the belt 22 may cause the spring 42 to extend slightly. When the idler pulley 28 springs back to its normal position the spring 42 will be completely compressed, which will act as a backstop that will dampen or otherwise hinder the compression spring 42 from springing back and forth or oscillating between stretched and compressed modes. Furthermore, friction between the compression spring 42 and the rod member 34 will also act as a damper for hindering excessive springiness or harmonic oscillation of the compression spring 42 that may be caused by belt vibration during operation.

The present invention therefore provides a mechanism 10 for tensioning a drive belt 22 of a mower deck 14 for placing the proper tension in the mower deck belt 22 and for generally preventing the belt 22 from coming off the pulleys 18, 24 and 28 during operation. The tensioner mechanism 10 provides a compression spring 42 that applies the biasing force to the idler pulley 28. The compression spring 42 eliminates problems associated with fatigue failure of end hooks of tension springs. The compression spring 42 according to the present invention is completely compressed to its compacted position during normal mowing operations, and therefore provides a stop feature that prevents the idler pulley 28 from shifting in one direction when the slack portion of the belt 22 is placed under great tension, such as when one of the blades 12 strikes an obstruction or when a brake is applied to the drive pulley 24. This stop feature helps prevent the belt 22 from whipping or coming off of the pulleys 18, 24 and 28 and therefore facilitates uninterrupted mowing operations and reduces belt damage. The tensioner mechanism 10 and compression spring 42 are completely compressed during normal mowing operations, and therefore do not generate a loud noise or bang when a blade 12 strikes and obstruction or when the brake is applied to the drive pulley 24. The tensioner mechanism 10 according to the present invention is also easily adjustable via a pair of nuts 50 and 52 for applying the proper amount of tension to the drive belt 22.

The preferred embodiment of the present invention illustrated in FIGS. 1–3 shows the elongate rod member 34 slidably received within the threaded member 46 which is supported by the support member 54 mounted to the deck 14. The downturned end portion 36 of the rod member 34 is shown as being fixed with the idler arm 32. An alternative embodiment which falls within the scope of the present invention could also be provided wherein the tensioner mechanism 10 is flipped around from its configuration shown in FIGS. 1–3 such that the downturned end portion 36 of the rod member 34 is fixed with the support member 54 or a portion of the mower deck 14, and the threaded member 46 is supported by the idler arm 32. In this alternative embodiment, the pair of nuts 50 and 52 would engage the threaded member 46 in a manner similar to that shown in FIGS. 1–3, and would allow adjustment of the tension in the belt 22. The compression spring 42 would be completely compressed during normal mowing operations for hindering belt whip as described above.

The preferred embodiment illustrated in FIGS. 1–3 shows the support member 54 as a bracket member welded or otherwise fixed to the deck 14. Within the scope of the present invention, the support member 54 could also be defined as an integral portion of the mower deck housing.

We claim:

1. A tensioner mechanism adapted for placing tension in a drive belt of a mower deck, said mower deck including a drive pulley in driving engagement with the belt, a plurality of blade pulleys engaged with and driven by the belt, a plurality of mower blades operatively mounted with respective blade pulleys for rotation therewith beneath the mower deck for cutting vegetation, an idler pulley engaged with the belt for placing tension in said belt, and an idler arm to which the idler pulley is mounted, said idler arm is operatively pivotally mounted for allowing the idler pulley to swing toward engagement with the belt for placing tension in the belt, said tensioner mechanism comprising:

an elongate member operatively coupled between the idler arm and a support member operatively carried by the mower deck, and a compression spring carried on the elongate member between the idler arm and the support member for operatively pressing the idler pulley toward engagement with the belt, said compression spring being generally completely compressed during normal mowing operations for generally blocking the idler arm and idler pulley from swinging away from engagement with the belt during operation.

2. The invention of claim 1, wherein said elongate member is slidably supported by the support member and fixed with the idler arm.

3. The invention of claim 2, and further comprising a threaded member within which said elongate member is slidably received, said threaded member being adjustably fixed with the support member by a pair of nut members whose position with respect to the threaded member can be adjusted to alter the position of the threaded member with respect to the support member for adjusting the tension that the idler pulley places in the belt during normal mowing operations.

4. The invention of claim 1, and further comprising an abutment member coupled with the elongate member, said abutment member being adapted to abut the threaded member for generally preventing the elongate member, support member and compression spring from becoming disassembled from each other.

5. The invention of claim 3, and further comprising an indicator fixed with the elongate member, the position of said indicator with respect to the threaded member serving to visually indicate to an operator when the tensioning mechanism has been adjusted to place the proper amount of tension in the belt during normal mowing operations.

6. A tensioner mechanism adapted for placing tension in a drive belt of a mower deck, said mower deck including a drive pulley in driving engagement with the belt, a plurality of blade pulleys engaged with and driven by the belt, a plurality of mower blades operatively mounted with respective blade pulleys for rotation therewith beneath the mower deck for cutting vegetation, an idler pulley engaged with the belt for placing tension in said belt, and an idler arm to which the idler pulley is mounted, said idler arm is operatively pivotally mounted for allowing the idler pulley to swing toward engagement with the belt for placing tension in the belt, said tensioner mechanism comprising:

an elongate member operatively coupled with the idler arm, and slidably mounted with a support member operatively carried by the mower deck, a compression spring carried on the elongate member between the idler arm and the support member for operatively pressing the idler pulley into engagement with the belt away from the support member, said compression spring being generally completely compressed during normal mowing operations for generally blocking the idler arm from swinging toward the support member during operation, a threaded member within which said elongate member is slidably received, said threaded member being adjustably fixed with the support member by a pair of nut members whose position with respect to the threaded member can be adjusted to alter the position of the threaded member with respect to the mower deck for adjusting the tension that the idler pulley places in the belt during normal mowing operations, and an indicator fixed with the elongate member, the position of said indicator with respect to the threaded member serving to visually indicate to an operator that the tensioning mechanism has been adjusted to place the proper amount of tension in the belt during normal mowing operations.

7. The invention of claim 6, and further comprising an abutment member coupled with the elongate member for generally preventing the elongate member, support member and compression spring from becoming disassembled.

8. A tensioner mechanism adapted for placing tension in a drive belt of a mower deck, said mower deck including a drive pulley in driving engagement with the belt, a plurality of blade pulleys engaged with and driven by the belt, a plurality of mower blades operatively mounted with respective blade pulleys for rotation therewith beneath the mower deck for cutting vegetation, an idler pulley engaged with the belt for placing tension in said bolt and an idler arm to which the idler pulley is mounted, said idler arm is operatively pivotally mounted for allowing the idler pulley to swing toward engagement with the belt for placing tension in the belt, said tensioner mechanism comprising:

an elongate member operatively coupled between the idler arm and a support member operatively carried by the mower deck, said elongate member is slidably supported by the support member and fixed with the idler arm, a compression spring carried on the elongate member between the idler arm and the support member for operatively pressing the idler pulley toward engagement with the belt, said compression spring being generally completely compressed during normal mowing operations for generally blocking the idler arm and idler pulley from swinging away from engagement with the belt during operation, and a threaded member within which said elongate member is slidably received, said threaded member being adjustably fixed with the support member by a pair of nut members whose position with respect to the threaded member can be adjusted to alter the position of the threaded member with respect to the support member for adjusting the tension that the idler pulley places in the belt during normal mowing operations.

9. A tensioner mechanism adapted for placing tension in a drive belt of a mower deck, said mower deck including a drive pulley in driving engagement with the belt, a plurality of blade pulleys engaged with and driven by the belt, a plurality of mower blades operatively mounted with respective blade pulleys for rotation therewith beneath the mower deck for cutting vegetation, an idler pulley engaged with the belt for placing tension in said belt, and an idler arm to which the idler pulley is mounted, said idler arm is operatively pivotally mounted for allowing the idler pulley to swing toward engagement with the belt for placing tension in the belt, said tensioner mechanism comprising:

an elongate member operatively coupled between the idler arm and a support member operatively carried by the mower deck, said elongate member being slidably supported by the support member and fixed with the idler arm, a compression spring carried on the elongate member between the idler arm and the support member for operatively pressing the idler pulley toward engagement with the belt, said compression spring being generally completely compressed during normal mowing operations for generally blocking the idler arm and idler pulley from swinging away from engagement with the belt during operation, a threaded member within which said elongate member is slidably received, said threaded member being adjustably fixed with the support member by a pair of nut members whose position with respect to the threaded member can be adjusted to alter the position of the threaded member with respect to the support member for adjusting the tension that the idler pulley places in the belt during normal mowing operations, and an indicator fixed with the elongate member, the position of said indicator with respect to the threaded member serving to visually indicate to an operator when the tensioning mechanism has been adjusted to place the proper amount of tension in the belt during normal mowing operations.

* * * * *

UNITED STATES PATENT AND TRADEMARK OFFICE
CERTIFICATE OF CORRECTION

PATENT NO. : 5,769,747
DATED : 23 JUne 1998
INVENTOR(S) : John Boyd Kuhn et al.

It is certified that error appears in the above-indentified patent and that said Letters Patent is hereby corrected as shown below:

Claim 4, column 9, line 28, delete "claim 1" and insert -- claim 3 --.

Signed and Sealed this

Fifteenth Day of June, 1999

Attest:

Q. TODD DICKINSON

Attesting Officer     Acting Commissioner of Patents and Trademarks